United States Patent [19]
Boon et al.

[11] Patent Number: 6,112,157
[45] Date of Patent: Aug. 29, 2000

[54] CONSTANT-CURRENT REGULATOR WITH REDUNDANT BUS CONTROL

[75] Inventors: Julien Boon, Sint-Genesius-Rode; Jean-Claude Vandevoorde, Steenkokkerzeel, both of Belgium

[73] Assignee: Siemens Aktiengesellschaft, Munich, Germany

[21] Appl. No.: 09/080,209

[22] Filed: May 18, 1998

[30] Foreign Application Priority Data

May 16, 1997 [DE] Germany ............................ 197 20 732

[51] Int. Cl.$^7$ ........................................................ G05F 1/10
[52] U.S. Cl. .................................. 702/58; 307/60; 361/63; 361/70; 361/87
[58] Field of Search .................................. 361/31, 57, 63, 361/87, 93, 70; 702/58, 60, 64; 307/60; 318/432; 323/312, 315, 299, 304

[56] References Cited

U.S. PATENT DOCUMENTS

| | | | |
|---|---|---|---|
| 5,537,308 | 7/1996 | Gritter | 363/95 |
| 5,644,304 | 7/1997 | Pavarotti et al. | 340/953 |
| 5,926,115 | 7/1999 | Schleder et al. | 340/953 |
| 6,000,042 | 12/1999 | Henrie | 714/40 |

OTHER PUBLICATIONS

Lee, "Integration of Aviation Lighting System and Computer Controlled Monitoring System", IEEE, 1996.

*Primary Examiner*—Patrick Assouad
*Attorney, Agent, or Firm*—Sughrue, Mion, Zinn, Macpeak & Seas, PLLC

[57] ABSTRACT

A constant-current regulator regulates and monitors the current fed to one or more downstream loads. It also serves to even out the current fed to the downstream load or loads at the control level or when there is a change in the control level. In order to enhance the security and reliability of operation of such a constant-current regulator when installed in a control and monitoring circuit, control signals having a similar regulating/monitoring content are applied to the constant-current regulator by means of two separate busses (3, 4) in a mutually independent manner. The constant-current regulator is used to carry out a separate plausibility/conformity check of the control signals from the first bus (3) and the control signals from the second bus (4). If a lack of plausibility/conformity is ascertained for the control signals of the first bus (3), the control signals of the second bus (4) are taken as the basis for operation of the constant-current regulator. On the other hand, if a lack of plausibility/conformity is ascertained for the control signals of the second bus (4), the control signals of the first bus (3) are taken as the basis for operation of the constant-current regulator.

19 Claims, 2 Drawing Sheets

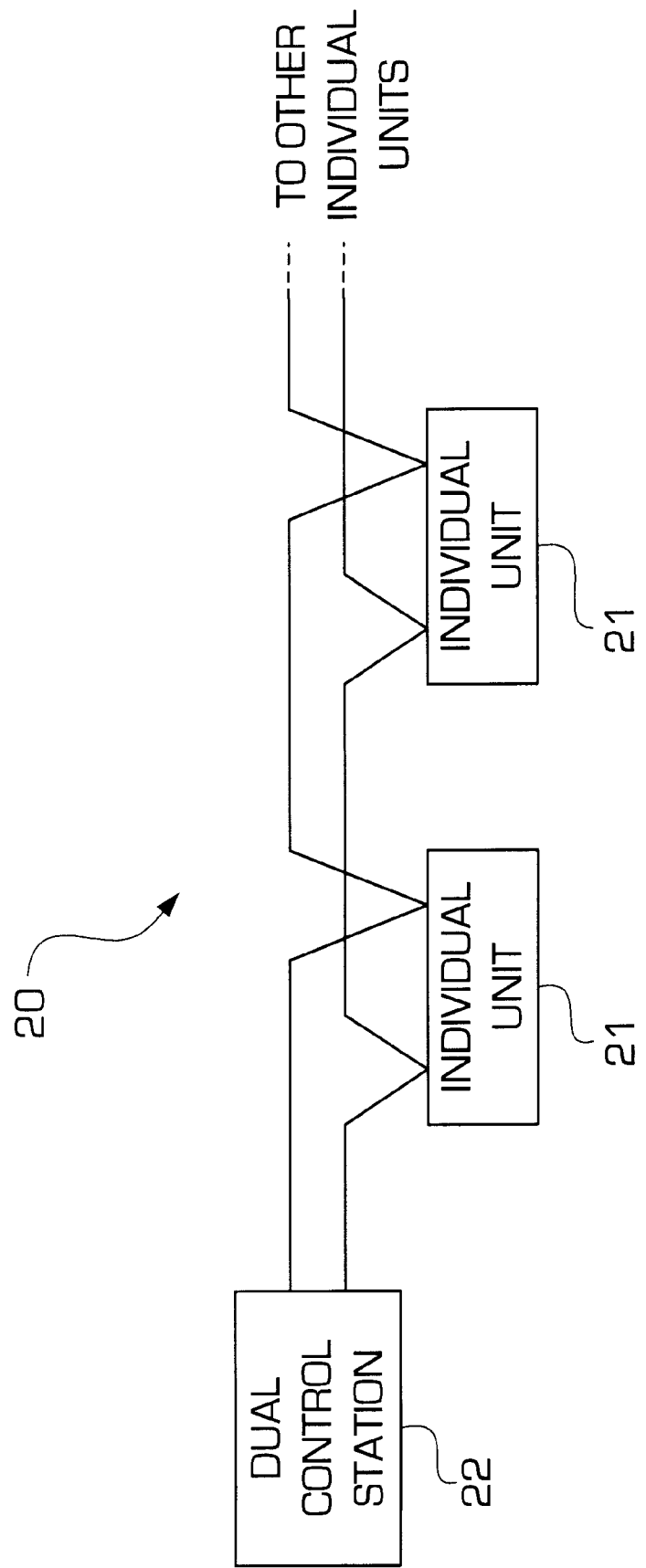

CONSTANT-CURRENT REGULATOR WITH REDUNDANT BUS CONTROL

FIELD OF AND BACKGROUND OF THE INVENTION

The invention relates to mew and useful improvements in constant-current regulators. More particularly, the invention relates to a constant-current regulator for regulating and monitoring the current fed to one or more downstream loads, and for evening out the current fed to the current.

Such constant-current regulators are often used in control, regulating and monitoring systems. The demands on such control, regulating and monitoring circuits, which are often used in traffic systems and industrial installations, are becoming ever more stringent. On the one hand, the subjects to be controlled, regulated and monitored are becoming more and more complicated; on the other hand, the demands on accuracy and operational security with regard to the control, regulation and monitoring are constantly being raised.

OBJECTS OF THE INVENTION

It is therefore a first object of the invention to further develop the generic constant-current regulator described in the introduction above in such a way that it satisfies heightened demands regarding its operational security and reliability. It is a further object to develop the constant-current regulator in such a way that in contributes to prolonging the service life of downstream loads considerably.

SUMMARY OF THE INVENTION

These and other objects are achieved by the teachings of claims 1 and 19. Particularly advantageous refinements of the invention are the subject matter of the dependent claims.

According to the invention, a constant-current regulator is provided for regulating and monitoring current fed to at least one downstream load and for evening out the current fed to the at least one downstream load at a control level or in response to a change in the control level for the current. The regulator includes a first bus and a second bus, which are mutually independent, separate busses for applying control signals having a similar regulating and monitoring content. A first processing stage of the regulator performs separate integrity checks of the control signals from the first bus and the control signals from the second bus. A second processing stage causes the control signals from the second bus or from the first bus, respectively, to be used as a basis for operation of the constant-current regulator if the integrity check of the first processing stage ascertains a lack of integrity for the control signals from the first bus or from the second bus, respectively.

The invention therefore provides the following features:
control signals having a similar regulating/monitoring content are applied to the constant-current regulator by means of two separate busses in a mutually independent manner,
the constant-current regulator is used to carry out a separate plausibility/conformity check of the control signals from the first bus and the control signals from the second bus,
if a lack of plausibility or conformity is ascertained for the control signals from the first or first bus, respectively, are taken as a basis for operation of the constant-current regulator.

The control signals are introduced with redundancy into the constant-current regulator according to the invention. This ensures that the constant-current regulator operates reliably and correctly even if the control signals input into the constant-current regulator by the first or second bus are subjected to interference or are corrupted.

The plausibility/conformity check, which proceeds internally within the constant-current regulator, makes it possible to ascertain whether the control signals from the first or second bus are corrupted or subjected to interference. When there is interference in the control signals from the first or second bus, the control signals from the respective other bus, which are not subjected to interference, are automatically utilized for operating the constant-current regulator.

The downstream load or loads are thus exposed to the current intensity envisaged for them with greater precision and reliability than that afforded by the conventional art. The invention therefore equips the constant-current regulator with, as it were, a redundant multidrop bus control system. This satisfies the enhanced security and reliability demands in light of contemporary service conditions since, if one of the two busses fails or is subjected to interference, a changeover to the functioning bus automatically occurs. In principle, the invention permits existing constant-current regulators which are controlled and monitored by means of one bus to be retrofitted with a further bus and appropriate supplementary components. If necessary, the parameters that are controlled and/or monitored by the two busses of the constant-current regulator of the invention can be expanded or adapted in the event of changing demands.

It is expedient to use a microprocessor to carry out the plausibility/conformity check of the control signals input into the constant-current regulator by the busses. The microprocessor may be configured as a simple processor and have a separate control input for each of the two busses. If a plausibility/conformity check of the incoming control signals from the two busses reveals interference or corruption of the control signals applied to one of the two control inputs, the microprocessor automatically switches to the control input carrying those control signals whose plausibility/conformity check led to a positive result.

By way of example of a preferred embodiment, the plausibility/conformity check routine can consist of two consecutive checks on all incoming messages. The first check is a conformity check, consisting of a verification of the level and the format of the incoming signals, followed by a Cyclic Redundancy Check (CRC) on the complete message. If a message fails on either test, it is rejected. When the failing message persists beyond a preset limit, a switchover to the alternate bus is initiated.

If the message is conformal, it is subjected to a second check, which is a plausibility check. This is a software routine that checks whether the data received in the message matches an acceptable template and whether the data for each transmitted parameter fall within their acceptable range. If a value outside the predefined limits is found, the message is rejected. When the failure persists beyond a preset limit, a switchover to the alternate bus is initiated. Accordingly, only those messages that are both conformal and plausible are further processed.

It is expedient for the microprocessor of the constant-current regulator according to the invention to have a digital control input for the first bus and a serial control input for the second bus.

In an advantageous embodiment, the control inputs of the microprocessor are of dual design and are insulated from one another. In other words, there are two control inputs; and the mutual insulation of the two control inputs prevents systematic damage to both control inputs. The insulation of the two control inputs also acts with respect to ground and with respect to the other core electronics, including the microprocessor circuits.

In an advantageous embodiment of the constant-current regulator according to the invention, an asynchronous receiver/transmitter is connected upstream of the digital control input of the microprocessor. The output signals of this receiver/transmitter are fed to the digital control input of the microprocessor. An electrically insulated, dual operation transmitter/receiver is connected upstream of the receiver/transmitter and is connected to a first bus input assigned to the first bus.

A further electrically insulated dual operation transmitter/receiver is connected upstream of the serial control input of the microprocessor and is connected to a second bus input assigned to the second bus. The further transmitter/receiver may be essentially identical to the first transmitter/receiver, assigned to the digital control input of the microprocessor. The input areas of the microprocessor that are assigned to the digital or serial control input are configured asymmetrically despite the largely identical configuration of the two transmitters/receivers. This means that there is only a very slight probability, if any, of a total failure occurring in the event of a limit signal.

The asynchronous receiver/transmitter is preferably a universal asynchronous receiver/transmitter (UART). This is an electronic component that is capable of receiving a serial information stream (bit sequential) and transforming it into a sequence of basic information blocks (bytes), which can then be read and processed directly by the microprocessor system. The UART exhibits dual operation, i.e., bidirectional operation. The speed and other characteristics of the serial stream are presettable through this component. Also, there is a first level check on the quality of the received serial information, e.g., with respect to speed, level, format and so forth. Buffers are preferably included in the UART, to allow flexible access by the microprocessor.

The above-mentioned transmitter/receivers preferably incorporate the following basic elements: (a) noise suppressors and bandwidth limiters, which are used to eliminate damage to the electronics as a consequence of induced high voltage spikes; (b) line receivers/transmitters at the head of the bus; and (c) galvanic isolators. For incoming signals, the line receivers/transmitters reformat a variable level received differential signal (balanced line) to a single line logic signal and transpose the levels to a voltage compatible with the other hardware components of the system. For outgoing signals, the single line signal is transformed into a differential current limited signal at voltage levels compatible with the bus. The galvanic isolators are used to isolate the line receivers/transmitters from the rest of the electronics. These components further increase the isolation of the core electronics from possible harmful outside influences and preserve signal integrity by avoiding ground loops.

The microprocessor, the asynchronous receiver/transmitter, the two transmitters/receivers and the two bus inputs can advantageously be embodied in the framework of a printed circuit board assembly. This assembly can be mounted in a simple manner on the main part of the constant-current regulator.

Preferably, in the course of remedying interference, the constant-current regulator is reset to that operating state provided for the situation where both busses operate free from interference. In this operating state, the control signals from either the first or the second bus are taken as a basis for operation of the constant-current regulator. This arrangement ensures that whenever possible the constant-current regulator operates in the most secure way.

The constant-current regulator of the invention can be designed as an operational unit of a control and monitoring circuit having a plurality of such constant-current regulators designed as operational units. In this case, a main unit is installed at a substation of the control and monitoring circuit. This main unit can poll the individual operational units, by means of the two busses, at predetermined points in time for status information and control purposes. If these measures are implemented, highly functional and reliable control and monitoring circuits for very large and complicated systems can be realized with comparatively little technical outlay.

The constant-current regulator can be a constituent of a control and monitoring circuit whose components upstream of the constant-current regulator are designed with redundancy. This results in high operational security of the control and monitoring circuit even though the constant-current regulator or further constant-current regulators according to the invention present in the control and monitoring circuits contain just one microprocessor each. This microprocessor may be a communications processor of comparatively simple design.

Conventional field busses, e.g. MOD busses, PROFI busses, CAN busses or the like, can advantageously be used with the constant-current regulator. This and the availability of comparatively inexpensive telecommunications and computer technologies make it possible to manufacture the constant-current regulator according to the invention at comparatively low and accordingly acceptable cost.

Assembly and any emergency replacement involve only comparatively little effort, since simple connectors can be used for the control and monitoring inputs. In other words, the bus connections are implemented as simple plug-in connectors which do not require special tools to plug and unplug. Accordingly, if an individual unit is defective, it can readily be disconnected from both busses and replaced by an equivalent, functioning unit.

The constant-current regulator according to the invention can be combined with various loads, e.g. with control/monitoring equipment for individual or group lighting fixtures, switching equipment, high-voltage equipment, irrigation controllers, fuel controllers and the like.

Furthermore, a control and monitoring circuit equipped with inventive constant-current regulators is very flexible, since the constant-current regulator enables regulation and monitoring of various downstream loads provided in a local area. These various loads can be controlled by the same two busses or in each case one of these two busses.

BRIEF DESCRIPTION OF THE DRAWINGS

The invention and further advantageous refinements thereof according to the features of the dependent claims are explained in more detail below with the aid of diagrammatic, exemplary embodiments in the drawing, in which:

FIG. 2 shows an example of a configuration for a control and monitoring circuit.

DETAILED DESCRIPTION OF THE PREFERRED EMBODIMENTS

Figure 1:
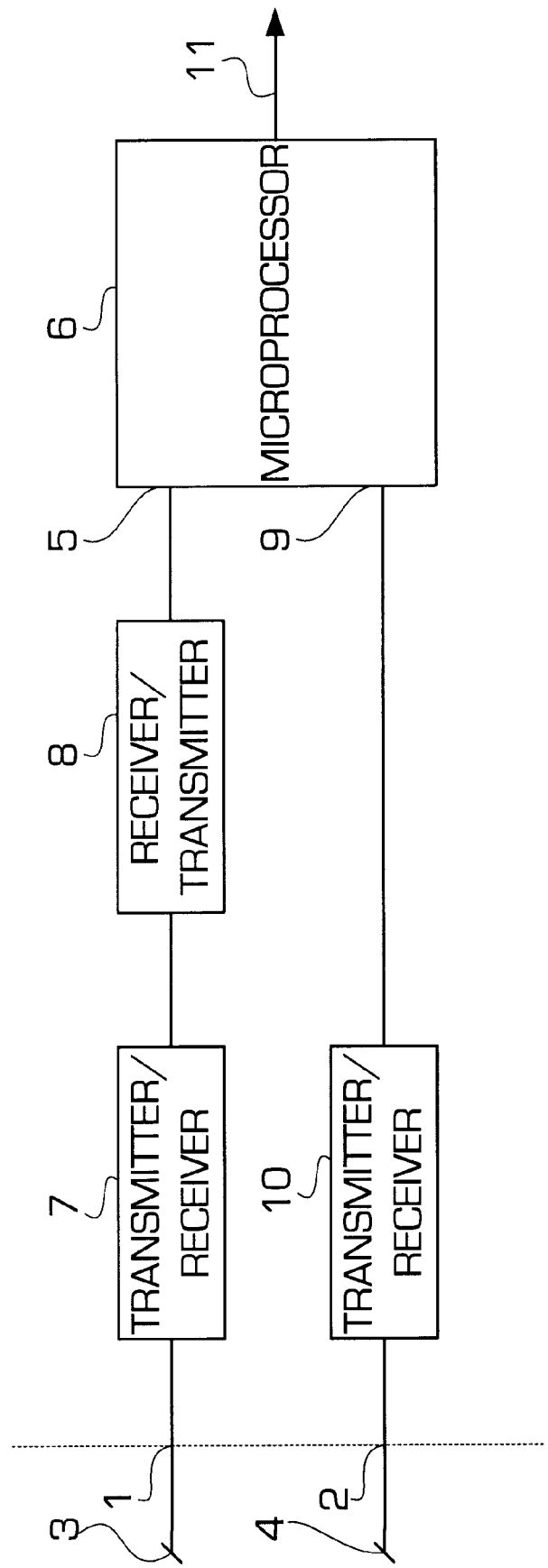
FIG. 1 illustrates a front input area of a constant-current regulator according to the invention.

The front input area illustrated in FIG. 1 has two bus inputs 1, 2. The bus input 1 is assigned to a first bus 3, whereas the bus input 2 is assigned to a second bus 4.

A transmitter/receiver 7 is arranged between the bus input 1, assigned to the first bus 3, and a digital control input 5 of a microprocessor 6. An asynchronous receiver/transmitter 8 is situated between the transmitter/receiver 7 and the digital control input 5 of the microprocessor 6.

The arrangement illustrated in the single figure has a further transmitter/receiver 10 between the bus input 2, assigned to the second bus 4, and a serial control input 9 of the microprocessor 6. The transmitter/receiver 10 may be essentially identical to the transmitter/receiver 7.

Since a detailed description of the internal design of the various components 5–10 is set forth in the Summary of the Invention section, above, that description is not repeated here. The dashed line in FIG. 1 separates the area outside the constant-current regulator from the input area of the constant-current regulator. An output line 11 of the microprocessor 6 leads to the main circuit arrangements of the rest of the constant-current regulator (not illustrated).

Mutually corresponding control signals are applied to the input area of the constant-current regulator, and thus to the microprocessor 6, by the first bus 3 and by the second bus 4. Accordingly, the following different situations are possible during operation of the constant-current regulator provided with the circuit illustrated in the single figure:

(1) Both busses 3, 4 are in a proper state.

The transmitter/receiver 7 receives control signals from the first bus 3 through the bus input 1; the transmitter/receiver 10 receives control signals from the second bus 4 through the bus input 2. From the transmitter/receiver 7, the control signals are passed through the asynchronous receiver/transmitter 8 to the digital control input 5 of the microprocessor 6. From the transmitter/receiver 10, the control signals pass through the serial control input 9 to the microprocessor 6. The microprocessor 6 subjects the control signals input through its digital control input and its serial control input 9 to separate plausibility/conformity checks. Any transmission errors can also be determined in the course of these checks. Since both busses 3, 4 are operating properly, the constant-current regulator can be operated either on the basis of the control signals originating from the bus 3 or on the basis of the control signals originating from the bus 4. Depending on internal preselection within the constant-current regulator, therefore, the control signals originating either from the bus 3 or from the bus 4 are made the basis for operation of the constant-current regulator, and data serving monitoring purposes are correspondingly entered into the bus 3 or into the bus 4.

(2) The bus 3 is not operating properly while the bus 4 is operating properly.

The transmitter/receiver 10 receives correct control signals from the bus 4 through the bus input 2 and passes them on to the serial control input 9 of the microprocessor 6 of the constant-current regulator. These control signals are analyzed by the microprocessor 6 and, since the bus 4 is operating properly, are determined to be correct.

The transmitter/receiver 7 receives erroneous control signals from the defectively operating bus 3 through the bus input 1. These erroneous control signals pass through the asynchronous receiver/transmitter 8 connected downstream of the transmitter/receiver 7. Consequently, erroneous control signals reach the microprocessor 6 through the digital control input 5. The microprocessor 6 analyzes these control signals and detects erroneous control signals as a result of the plausibility/conformity check.

The microprocessor 6 decides that operation of the constant-current regulator will take place on the basis of the control signals input into the input area of the constant-current regulator by the properly operating bus 4. Corresponding signals are passed through the output line 11 of the microprocessor 6 to the downstream areas of the constant-current regulator.

A "caution" signal is output in a suitable form by means of the correctly operating bus 4. This signal indicates defective operation of the bus 3. Data serving monitoring purposes are communicated by the constant-current regulator to upstream areas of the control circuit by means of the properly operating bus 4.

(3) The bus 3 is operating properly while the bus 4 is operating defectively.

The transmitter/receiver 7 receives correct control signals from the bus 3 through the bus input 1 and passes them via the downstream asynchronous receiver/transmitter 8 to the digital control input of the microprocessor. These control signals are subjected to a plausibility/conformity check in the microprocessor 6 and, since the bus 3 is operating properly, are determined to be free from errors, i.e. correct.

The transmitter/receiver 10 receives erroneous control signals from the bus 4 through the bus input 2. These control signals arrive at the serial control input 9 of the microprocessor 6, where they are subjected to a plausibility/conformity check whose result reveals that the control signals are erroneous. The microprocessor 6 therefore decides that the control signals input into the constant-current regulator by the correctly operating bus 3 will be taken as a basis for operation of the constant-current regulator. The microprocessor 6 passes corresponding signals through its output line 11 to the downstream areas of the constant-current regulator. A "caution" signal is output through the bus 3. This signal indicates that the bus 4 is operating defectively. The constant-current regulator compulsorily forwards data serving monitoring purposes through the properly operating bus 3 to areas of the control and monitoring circuit that are connected upstream of the bus 3.

(4) Both the bus 3 and the bus 4 are operating improperly.

The digital control input 5 of the microprocessor 6 receives erroneous control signals from the defectively operating first bus 3 via the asynchronous receiver/transmitter 8, the transmitter/receiver 7 and the bus input 1. The serial control input 9 of the microprocessor 6 receives erroneous control signals from the defectively operating second bus 4 via the transmitter/receiver 10 and the bus input 2. From the separate plausibility/conformity checks, the microprocessor 6 ascertains that both the control signals originating from the bus 3 and the control signals originating from the bus 4 are erroneous. As a result, the microprocessor 6 terminates signal output to the busses 3, 4 and, furthermore, enables a local control interlock configured in a known manner. Neither the erroneous control signals originating from the bus 3 nor those originating from the bus 4 are taken as a basis for operation of the constant-current regulator area connected downstream of the microprocessor 6. Instead, the constant-current regulator either maintains its previous operating state or it changes to an operating state defined in advance for the failure of both busses 3, 4. Since either response is feasible in principle, one possibility is to perform a corresponding internal preselection as a function of other parameters in the microprocessor 6, in order to select the more appropriate response.

After a predetermined period of time has elapsed, a main unit assigned to the relevant constant-current regulator in the monitoring and control circuit outputs an ALARM signal. This signal indicates that the relevant constant-current regulator can no longer be controlled by the busses 3, 4. Suitable, well-coordinated timeouts for the main unit and for the operational units are introduced between the main unit and its assigned operational units or constant-current regulators.

When the control signals transmitted by the busses 3, 4 are reestablished, or when the busses 3, 4 operate properly again, this situation is detected and the constant-current regulator resumes the mode of operation that has been described for the situation where both the bus 3 and the bus 4 are operating properly. This always ensures that the constant-current regulator has an extremely reliable and extremely secure mode of operation to the furthest reasonable extent possible.

FIG. 2 illustrates, by way of example, a main unit and several of its assigned operational units. The entire system together forms a control and monitoring circuit 20. The control and monitoring circuit 20, in addition to a plurality of individual units 21, includes a dual control station 22. The dual control station 22 is one embodiment of a unit installed at a substation for polling the various individual units 21 at predetermined times for the purpose of ascertaining status information and forwarding control signals. The individual units each include bus interfaces, control electronics, power electronics, and output connections to the load, as described hereinbefore.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A constant-current regulator for regulating and monitoring current f ed t o at least one downstream load and for evening out the current fed to the at least one downstream load at a control level or in response to a change in the control level for the current, comprising:

a first bus and a second bus, said first and second busses being two mutually independent, separate busses for applying control signals having a similar regulating and monitoring content to the constant-current regulator;

a first processing stage for performing separate integrity checks of the control signals from said first bus and the control signals from said second bus; and a second processing stage for causing the control signals from said second bus or from said first bus, respectively, to be used as a basis for operation of the constant-current regulator if the integrity check of said first processing stage ascertains a lack of integrity for the control signals from said first bus or from said second bus, respectively.

2. The constant-current regulator as claimed in claim 1, wherein said integrity check comprises a plausibility check and a conformity check of the control signals.

3. The constant-current regulator as claimed in claim 1, wherein said first processing stage is provided in a microprocessor that performs the separate integrity checks of the control signals input into the constant-current regulator by said first and second busses.

4. The constant-current regulator as claimed in claim 3, wherein said microprocessor has separate control inputs for said first and second busses.

5. The constant-current regulator as claimed in claim 4, wherein said first control input of said microprocessor is a digital control input for said first bus and said second control input of said microprocessor is a serial control input for said second bus.

6. The constant-current regulator as claimed in claim 4, wherein said separate control inputs of said microprocessor are of dual design and are insulated from one another, from ground and from a remainder of said microprocessor.

7. The constant-current regulator as claimed in claim 5, further comprising:

an asynchronous receiver/transmitter connected upstream of said digital control input of said microprocessor, an output signal of said receiver/transmitter being fed to said digital control input of said microprocessor; and a transmitter/receiver connected upstream of said receiver/transmitter and connected to a first bus input assigned to said first bus, said transmitter/receiver being electrically insulated and of dual operation.

8. The constant-current regulator as claimed in claim 5, further comprising:

a transmitter/receiver connected upstream of said serial control input of said microprocessor and connected to a bus input assigned to said second bus, said transmitter/receiver being electrically insulated and of dual operation.

9. The constant-current regulator as claimed in claim 7, further comprising:

a further transmitter/receiver connected upstream of said serial control input of said microprocessor and connected to a second bus input assigned to said second bus, said transmitter/receiver being electrically insulated and of dual operation.

10. The constant-current regulator as claimed in claim 9, wherein said microprocessor, said asynchronous receiver/transmitter, said transmitter/receiver, said further transmitter/receiver, and said first and second bus inputs are combined in a printed circuit board assembly.

11. The constant-current regulator as claimed in claim 1, wherein, if the integrity check of said first processing stage fails to ascertain a lack of integrity for the control signals either from said first bus or from said second bus, said second processing stage selects the control signals from one of said first and said second bus according to a predetermined protocol, to be used as the basis for operation of the constant-current regulator.

12. The constant-current regulator as claimed in claim 11, wherein said second processing stage comprises a reset state, whereby said second processing stage selects the control signals according to the predetermined protocol following correction of an ascertained lack of integrity.

13. The constant-current regulator as claimed in claim 1, designed as an individual operational unit of a control and monitoring circuit, said control and monitoring circuit further comprising:

additional ones of said constant-current regulators, each designed as further individual operational units; and a substation comprising a main unit configured to poll said individual operational units, at predetermined times, for status information and control purposes, by means of said first and second busses.

14. The constant-current regulator as claimed in claim 1, wherein said constant-current regulator is a constituent of a control and monitoring circuit, and wherein components of said control and monitoring circuit upstream of said constant-current regulator are of redundant design.

15. The constant-current regulator as claimed in claim 1, wherein said first and second busses are selected from the group consisting of MOD busses, PROFI busses, and CAN busses.

16. The constant-current regulator as claimed in claim 9, wherein said first and second bus inputs are control and monitoring inputs fashioned as connectors.

17. The constant-current regulator as claimed in claim 1, further comprising an output line fashioned to connect variously to a plurality of loads.

18. The constant-current regulator as claimed in claim 1, further comprising a signal lines for monitoring and regulating a plurality of downstream loads provided in a local area.

19. A method for monitoring and regulating current fed to at least one downstream load, comprising:

receiving a first control signal by means of a first bus;

receiving a second control signal having an analogous content to the first control signal by means of a second bus that is independent and separate from the first bus;

performing a check for plausibility and conformity of the first control signal;

performing a separate check for plausibility and conformity of the second control signal;

if the check of the first control signal ascertains a lack of plausibility or conformity for the first control signal, utilizing the second control signal as a signal for monitoring and regulating the current; and if the separate check of the second control signal ascertains a lack of plausibility or conformity for the second control signal, utilizing the first control signal as the signal for monitoring and regulating the current.

* * * * *